May 28, 1968 C. B. REIFF 3,385,936
MAGNETIC TAPE REPRODUCER UTILIZING PHASE ERROR CONTROLLED SIGNAL SUPPRESSION
Filed Sept. 24, 1964
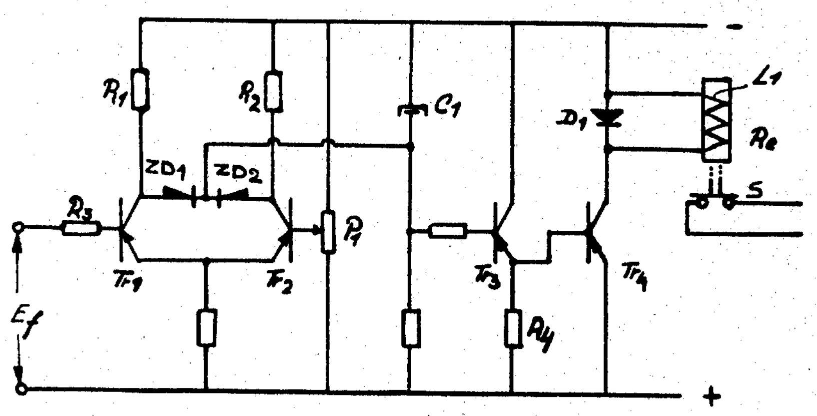
INVENTOR
Cornelis Bernardus Reiff
BY
Dean, Fairbank & Hirsch
ATTORNEYS United States Patent Office 3,385,936

Patented May 28, 1968

3,385,936

MAGNETIC TAPE REPRODUCER UTILIZING PHASE ERROR CONTROLLED SIGNAL SUPPRESSION

Cornelis Bernardus Reiff, Vlaardingen, Netherlands, assignor to N.V. Optische Industries "De Oude Delft"

Filed Sept. 24, 1964, Ser. No. 399,011
Claims priority, application Netherlands, Sept. 30, 1963, 298,592
1 Claim. (Cl. 179—100.2)

ABSTRACT OF THE DISCLOSURE

A magnetic video tape reproducer with a video signal suppressing circuit which is designed to temporarily cut off the output in response to an error signal developed when the magnetic head assembly is out of phase with the signal tracks on the tape.

This invention relates to the reproduction of video signals which have been recorded on a magnetic tape. Magnetic video tape recorders are now well-known in the art. They generally use a quickly rotating magnetic head assembly having one or more magnetic transducers which scan successive tracks lying in side-by-side relation on the tape and extending transversely thereof or at an acute angle relative to the length thereof. The tape is fed past the head assembly at a rate which is moderate compared to the speed of the magnetic heads.

In order to insure that, during reproduction, the position of the magnetic heads relative to the tape is correct, i.e., such that the tracks scanned by the heads coincide with the tracks in which the signal has been recorded, some type of a control system is used which compares the phase of a first control signal derived e.g. from synchronizing pulses recorded on the tape with that of a second control signal derived from the magnetic head assembly. Any difference in phase between these two control signals means that the reproducing heads and the tape have not been completely synchronized, which results in dislocation of the image points in the reproduced pictures so that the pictures obtained are useless. Accordingly, such phase differences are detected in a phase comparator and an error signal is developed which corrects the speed of either the tape driving motor or the head assembly driving motor until synchronous operation is obtained. Control systems of this kind have been described e.g. in patent specifications Nos. 3,172,949 and 3,175,034.

Noticeable deviations from the situation of synchronism do not only occur when the reproducing device is started, but also during operation at the transition between two programs recorded on the same tape, whose tracks have a random phase shift relative to each other.

Such phase shift will occur particularly if the recording apparatus has been stopped for a while between the recordings of the two consecutive programs, e.g. in order to prevent loss of tape during waiting intervals which are sometimes inevitable.

After each transition between two such programs the reproducing heads must be synchronized once more with the tracks on the tape, which process requires a certain time. During this time incoherent images appear on the reproducing screen, which are very annoying to the observer.

The invention has for its object to provide apparatus of the type indicated in which such non-synchronized pictures are suppressed. For that purpose the invention is characterized by the provision of means which, under the control of the error signal, automatically suppress the signal picked up by the reproducing heads during periods wherein the reproducing heads are not in synchronism with the track recorded on the tape.

The sole figure of the drawing shows by way of example a schematic diagram of circuitry suitable for the purpose described. It consists of two amplifiers coupled together by two Zener diodes ZD1 and ZD2. The first amplifier stage with the two mutually identical transistors Tr1 and Tr2 forms a differential amplifier; the second amplifier stage with the transistors Tr3 and Tr4 serves to energize the winding L1 of the relay Re. This relay operates the switch 5 in the video-output of a conventional video tape recorder current (not shown further).

The control signal Ef is applied to the base of transistor Tr1 through the resistance R3. The control signal Ef in the example shown is a D.C. voltage having a predetermined value if synchronism exists between tape and heads, but showing a positive or negative going deviation (the error signal) from that value in case of nonsynchronism. The transistor Tr2 receives its base potential from the potentiometer P1. This potentiometer is adjusted so, that with synchronism of the device the base potentials of the transistors Tr1 and Tr2 are equal.

In this situation the voltage across the Zener diodes ZD1 and ZD2 remains below the Zener voltage. Consequently, these diodes do not conduct current, whereby the potential at the base of transistor Tr3 has a value such that this transistor, which is connected as an emitter-follower, is nonconductive. The base potential for Tr4 is obtained from the emitter resistance R4 of Tr3. In the event that Tr3 is nonconductive the same applies to Tr4. Consequently, in the synchronous situation relay Re is not energized and the video output can be displayed in the usual manner.

When synchronism gets lost, the incoming control signal Ef will show deviations from the value it has during the synchronous operation. As noted hereinbefore, this derivation can be positive or negative going, dependent on the position of the reproducing heads relative to the tracks recorded on the tape.

This deviation causes one of the two transistors Tr1 and Tr2 to conduct more current so that the potential drop across the collector resistors R1 or R2 increases. The circuit is so arranged that with a certain deviation of the control voltage from the synchronous value the voltage across one of the two Zener diodes ZD1 or ZD2 will exceed the Zener voltage of this diode. As a result the diode will become conductive and a base voltage for the transistor Tr3 will appear across the condenser C1. Owing to this, Tr3 becomes conductive and the voltage developed across the resistance R4 is applied to the base of transistor Tr4, whereby this transistor becomes conductive too. In this situation the relay Re is energized and the video-output is disconnected.

It will be evident that when the apparatus reaches synchronism again the original situation discussed above will be restored.

The induction voltage appearing when winding 4 is de-energized is suppressed in the well-known manner by means of diode D1.

What I claim is:

1. In a device for reproducing video signals recorded on a magnetic tape along signal tracks lying in side-by-side relation, including a first motor for driving said tape, a rotatable magnetic reproducing head assembly for successively scanning said signal tracks, a second motor for driving said head assembly, means for deriving a first control signal having a frequency proportional to the frame frequency of the reproduced video signal, means for deriving a second control signal having a frequency proportional to the speed of said second motor, phase comparator means for developing an error signal in response to phase differences between said first and second control signals, and means to correct the speed of at least one of said first and second motors in response to said error signal, a video signal suppressing circuit comprising a video input connected to said magnetic head assembly, a video output, means to disconnect said video output from said video input, means to receive said error signal from said phase comparator means and means to operate said disconnecting means responsive to reception of an error signal whereby said reproduced video signal is automatically suppressed during periods when said control signals are out of phase.

References Cited

UNITED STATES PATENTS 2,996,576 8/1961 Dolby ------------ 179—100.2

BERNARD KONICK, *Primary Examiner.*

H. STECKLER, *Assistant Examiner.*